United States Patent
Ji et al.

(10) Patent No.: US 12,317,890 B2
(45) Date of Patent: Jun. 3, 2025

(54) POLAR POLYOLEFIN DISPERSION BASED SEED COATING COMPOSITION

(71) Applicant: Dow Global Technologies LLC, Midland, MI (US)

(72) Inventors: Jing Ji, Shanghai (CN); Xue Chen, Manvel, TX (US); Peng Gao, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 640 days.

(21) Appl. No.: 17/635,148

(22) PCT Filed: Aug. 30, 2019

(86) PCT No.: PCT/CN2019/103571
§ 371 (c)(1),
(2) Date: Feb. 14, 2022

(87) PCT Pub. No.: WO2021/035665
PCT Pub. Date: Mar. 4, 2021

(65) Prior Publication Data
US 2022/0272966 A1    Sep. 1, 2022

(51) Int. Cl.
*A01N 25/10*  (2006.01)
*A01N 25/24*  (2006.01)

(52) U.S. Cl.
CPC .............. *A01N 25/10* (2013.01); *A01N 25/24* (2013.01)

(58) Field of Classification Search
CPC ........ A01N 25/10; A01N 25/24; A01N 51/00; A01P 7/04
See application file for complete search history.

(56) References Cited

U.S. PATENT DOCUMENTS

| | | | |
|---|---|---|---|
| 4,438,593 A | 3/1984 | McNew et al. | |
| 4,914,172 A * | 4/1990 | Seelmann-Eggebert | C08F 220/04 526/240 |
| 5,227,422 A * | 7/1993 | Mitsuji | C09D 151/06 524/507 |
| 2005/0013992 A1* | 1/2005 | Azad | A61L 15/60 428/407 |
| 2005/0197251 A1 | 9/2005 | Ding et al. | |
| 2007/0207927 A1 | 9/2007 | Rosa et al. | |
| 2008/0103044 A1 | 5/2008 | Tang et al. | |
| 2010/0204045 A1* | 8/2010 | Dieckmann | A01N 47/02 514/639 |
| 2011/0039694 A1 | 2/2011 | Rosa et al. | |
| 2012/0220454 A1 | 8/2012 | Chen et al. | |
| 2013/0065755 A1 | 3/2013 | Taylor et al. | |
| 2018/0030306 A1 | 2/2018 | Towell et al. | |

FOREIGN PATENT DOCUMENTS

| | | | |
|---|---|---|---|
| CN | 1480019 A | 3/2004 | |
| WO | 2013166020 A1 | 11/2013 | |
| WO | 2014137516 A1 | 9/2014 | |
| WO | 2016055096 A1 | 4/2016 | |
| WO | WO-2018022557 A1 * | 2/2018 | ............... A01C 1/06 |

OTHER PUBLICATIONS

L. Su et al., "Super absorbent polymer seed coatings promote seed germination and seedling growth of Caragana korshinskii in drought," Univ-Sci B (Biomed & Biotechnol) 2017 18(8): 696-706.*
Office Action from corresponding Chinese Patent Application: 201980099244.0 mailed Aug. 10, 2023.
Office Action from corresponding Japanese Patent Application: 2022-509615 mailed Aug. 8, 2023.
PCT/CN2019/103571, International Search Report and Written Opinion with a mailing date of May 29, 2020.

* cited by examiner

*Primary Examiner* — Monica A Shin

(57) ABSTRACT

A coated seed comprises a seed, and a coating composition coated on the seed comprising a polar polyolefin dispersion, which comprises: 1) a polar polyolefin; and 2) a neutralizing base; wherein the polar polyolefin is an olefin copolymer that contains one or more polar groups, wherein the polar groups are selected from the group consisting of a carboxylic acid group, a carboxylic acid anhydride group or a carboxylic acid salt moiety; wherein the neutralizing base is abase that modifies at least a portion of the carboxylic acid group, carboxylic acid anhydride group or carboxylic acid salt moiety of the polymer to form a stable aqueous dispersion with the polar polyolefin.

9 Claims, 2 Drawing Sheets

Grade 3    Grade 2    Grade 1

Grade 5    Grade 4    Grade 3    Grade 2    Grade 1

POLAR POLYOLEFIN DISPERSION BASED SEED COATING COMPOSITION

FIELD OF THE INVENTION

The present disclosure relates to a seed coating composition and a seed coated with the seed coating composition.

INTRODUCTION

The use of seed coatings as a delivery mechanism for plant growth stimulants and other active ingredients that help protect plants from insects, diseases and fungal attacks continues to grow as a means of increasing food supply. As more additives are applied to seed coatings, people are driven to develop improved seed coatings and polymers to contain the actives, thus improving crop performance. Generally, such seed coating formulations utilize a flowable concentrate for seed treatment. The flowable concentrate compositions are suspensions or dispersions of ingredients in water that are applied to seeds to form a film coating on the seeds prior to being planted. A seed coating formulation typically includes additives (e.g., a film forming agent) that help bind the coating to the seed surface along with colorants that indicate the seed has been treated. The seed coating formulation also includes active ingredients that are evenly distributed over the seed surface. Other components of the seed coating formulation may include a wetting agent, a dispersant, a thickener, etc.

To date, polyacrylate based seed coating formulations still dominate this market. However, there are still some significant problems associated with polyacrylate based seed coating formulations. For example, seed coatings formed with polyacrylate coating formulations are known to have poor water resistance, which results in the loss of the active ingredient when the coated seed is immersed in water. In addition, the film forming agent such as polyacrylate usually has poor adhesion strength, which with attrition results in a significant loss of the coating. Finally, some coatings can adversely affect effective seed germination, which results in a waste of resources. Therefore, there is a need in the art for a seed coating composition that provides water resistance to prevent the loss of active ingredients, less loss of the coating through attrition, and/or a coating which will not adversely affect the germination of the coated seed.

SUMMARY OF THE INVENTION

The present disclosure provides a seed coating composition and a seed coated with the seed coating composition.

In a first aspect, the present disclosure provides a coated seed comprising
a seed, and
a coating composition coated on the seed comprising a polar polyolefin dispersion, which comprises:
1) a polar polyolefin; and
2) a neutralizing base;
wherein the polar polyolefin is an olefin copolymer that contains one or more polar groups, wherein the polar groups are selected from the group consisting of a carboxylic acid group, a carboxylic acid anhydride group or a carboxylic acid salt moiety;
wherein the neutralizing base is a base that modifies at least a portion of the carboxylic acid group, carboxylic acid anhydride group or carboxylic acid salt moiety of the polymer to form a stable aqueous dispersion with the polar polyolefin.

It is to be understood that both the foregoing general description and the following detailed description are exemplary and explanatory only and are not restrictive of the invention, as claimed.

DETAILED DESCRIPTION OF THE INVENTION

Figure 1:
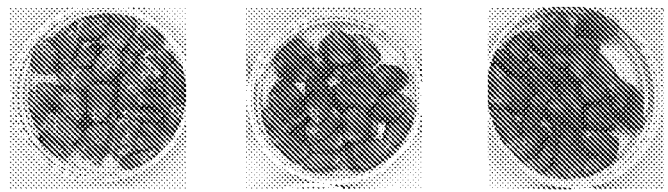
FIG. 1 shows the classification of attrition rate.

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, the term "composition", "formulation" or "mixture" refers to a physical blend of different components, which is obtained by mixing simply different components by a physical means.

The coated seed of the present disclosure comprises:
a seed, and
a coating composition coated on the seed comprising a polar polyolefin dispersion, which comprises:
1) a polar polyolefin; and
2) a neutralizing base;
wherein the polar polyolefin is an olefin copolymer that contains one or more polar groups, wherein the polar groups are selected from the group consisting of a carboxylic acid group, a carboxylic acid anhydride group or a carboxylic acid salt moiety;
wherein the neutralizing base is a base that modifies at least a portion of the carboxylic acid group, carboxylic acid anhydride group or carboxylic acid salt moiety of the polymer to form a stable aqueous dispersion with the polar polyolefin.

Polar Polyolefin

The polar polyolefin is an olefin copolymer that contains one or more polar groups, wherein the polar groups include a carboxylic acid group, a carboxylic acid anhydride group or a carboxylic acid salt moiety; preferably an olefin copolymer that contains one or more polar groups, wherein the polar group is a carboxylic acid group.

More specifically, the polar polyolefin is a copolymer of an olefin and an ethylenically unsaturated monomer that contains one or more polar groups, wherein the polar groups include a carboxylic acid group, a carboxylic acid anhydride group or a carboxylic acid salt moiety; preferably a copolymer of an olefin and an ethylenically unsaturated monomer that contains one or more polar groups, wherein the polar group is a carboxylic acid group. Preferably, the olefin can be a linear or branched C2-C6 α-olefin such as ethylene, propylene, 1-butylene, isobutylene and the like. The ethylenically unsaturated monomer that contains one or more polar groups can be acrylic acid, methacrylic acid, maleic acid, fumaric acid, itaconic acid, acrylic anhydride, methacrylic anhydride, maleic anhydride, fumaric anhydride, itaconic anhydride, preferably, acrylic acid or meth acrylic acid. Preferably, the ethylenically unsaturated monomer that contains one or more polar groups is acrylic acid.

Exemplary polar polyolefins include, but are not limited to, ethylene/acrylic acid (EAA) copolymers, ethylene/methacrylic acid copolymers, propylene/acrylic acid copolymers, or propylene/methacrylic acid copolymers, such as those available under the trademarks PRIMACOR, commercially available from SK Global Chemical Company, NUCREL, commercially available from The Dow Chemical Company, and ESCOR, commercially available from ExxonMobil Chemical Company.

Exemplary polar polyolefins also include ethylene/maleic anhydride copolymer, such as those available from The Dow Chemical Company under the trademark AMPLIFY GR.

Exemplary polar polyolefins further include ethylene/maleic anhydride and propylene/maleic anhydride copolymers, such as those available from Clariant International Ltd. under the trademark LICOCENE.

Neutralizing Base

Exemplary neutralizing bases can be an inorganic base or an organic base, include, but are not limited to, hydroxides of alkali metals, hydroxides of alkali earth metals, ammonia or organic amines. In one instance, the neutralizing agent is a strong base or a weak base. For example, the neutralizing agent may be sodium hydroxide, potassium hydroxide, ammonia or an amine, such as monoethanoloamine (MEA), triethanolamine (TEA), or dimethylaminoethanol (DMEA). Preferably, the neutralizing base is ammonia or an amine. More preferably, the neutralizing base is selected from the group consisting of monoethanoloamine (MEA), triethanolamine (TEA), and dimethylaminoethanol.

In one instance, 5 to 100 mole percent of the carboxylic acid groups of the polymer are modified by the neutralizing base. In another instance, 10 to 95 mole percent of the carboxylic acid groups or the carboxylic acid anhydride groups of the polymer are modified by the neutralizing base. In another instance 20 to 90 mole percent of the carboxylic acid groups or the carboxylic acid anhydride groups are modified by the neutralizing base. In still another instance 40 to 85 mole percent of the carboxylic acid groups or the carboxylic acid anhydride groups are modified by the neutralizing base. In still another instance 50 to 80 mole percent of the carboxylic acid groups or the carboxylic acid anhydride groups are modified by the neutralizing base. In still another instance 60 to 80 mole percent of the carboxylic acid groups or the carboxylic acid anhydride groups are modified by the neutralizing base, preferably, the neutralizing base is an amine, such as monoethanoloamine (MEA), triethanolamine (TEA), dimethylaminoethanol or a mixture thereof.

The seed coating composition can further comprise active ingredients, nutrients, fillers or other additives.

Active Ingredients

Active ingredients include, but are not limited to, pesticides, insecticides, termiticides, fungicides, moldicides, herbicides, plant growth regulators, crop dessicants, biocides, bacteriocides, bacteriostats, and insect repellants. Suitable pesticides include, for example, triazine herbicides; sulfonylurea herbicides; uracils; urea herbicides; acetanilide herbicides; and organophosphonate herbicides such as glyphosate salts and esters. Suitable fungicides include, for example, nitrilo oxime fungicides; imidazole fungicides; triazole fungicides; sulfenamide fungicides; dithio-carbamate fungicides; chloronated aromatic; and dichloro aniline fungicides. Suitable insecticides, include, for example, carbamate insecticides; organo thiophosphate insecticides; perchlorinated organic insecticides such as methoxychlor, and neonicotinoid insecticides such as Thiamethoxam. Suitable miticides include, for example, propynyl sulfite; triazapentadiene miticides; chlorinated aromatic miticides such as tetradifan; and dinitrophenol miticides such as binapacryl.

Nutrients

The seed coating composition can also comprise a nutrient such as a micronutrient or macronutrient. "Nutrient" as used herein can refer to an additive or substance utilized by plants, grasses, shrubs for plant, grass, and shrub growth, respectively. Macronutrients can be utilized in larger amounts by plants, grasses, etc. in proportionally larger amounts relative to micronutrients. Nutrients include but are not limited to manganese, boron, copper, iron, chlorine, molybdenum, and zinc, potassium, nitrogen, calcium, magnesium phosphorus and sulfur, among others. Compositions of the present invention can include various combinations and relative amounts of individual macronutrients.

Fillers

The seed coating composition can also include at least one filler. In one embodiment, the filler is selected from non-limiting examples such as wood flours, clays, activated carbon, carbohydrates, sugars, dextrins, maltodextrins, diatomaceous earth, cereal flours, wheat flour, oat flour, barley flour, fine-grain inorganic solids, calcium carbonate, calcium bentonite, kaolin, china clay, talc, perlite, mica, vermiculite, silicas, quartz powder, montmorillonite or mixtures thereof.

Other Additives

Other additives include, but are not limited to wetting agents, colorants, rheology modifiers, dispersing agents, anti-foam agents, anti-freeze agents, surfactants, fertilizers, thickeners, etc. The surfactants can be nonionic, anionic, or cationic.

Dispersions

The dispersion further comprises water.

The solid content of the dispersion is about 1 to about 75 weight percent of the combined weight of the polymer and the neutralizing base, based on the total weight of the dispersion, preferably, about 5 to about 60 weight percent of the combined weight of the polymer and the neutralizing base, based on the total weight of the dispersion, more preferably, about 10 to about 50 weight percent of the combined weight of the polymer and the neutralizing base, based on the total weight of the dispersion, still more preferably, about 20 to about 40 weight percent of the combined weight of the polymer and the neutralizing base, based on the total weight of the dispersion.

The permissible range of the polar polyolefin copolymer together with the neutralizing base in the seed coating composition should be about 0.2~10 wt %, and more preferably about 1~5 wt %, still more preferably, about 2~4 wt %, based on the total weight of the seed coating composition.

Coating Techniques

Suitable coating techniques may be utilized to coat the seeds or agglomeration of seed by the seed coating composition described herein. Equipment utilized to for coating can include but are not limited to drum coaters, rotary coaters, tumbling drums, fluidized beds and spouted beds, but any suitable equipment or technique may be employed. The seeds may be coated via a batch or continuous coating process.

The seeds can be separated prior to coating which, in one embodiment, utilizes mechanical means such as a sieve. The separated seeds can then be introduced into a coating machine having a seed reservoir. In one embodiment, the seeds in the mixing bowl are combined with one or more of the coatings described herein.

In one embodiment of the process, one or more layers as described herein can be added to coat the seed or agglomeration.

In another embodiment, agglomerators or agglomerator devices may also be utilized. Coating is performed within a rotary coater by placing seeds within a rotating chamber, which pushes the seeds against the inside wall of the chamber. Centrifugal forces and mixing bars placed inside the coater allow the seed to rotate and mix with a coating layer. The seed coating composition can be pumped into the proximate center of the coater onto an atomizer disk that rotates along with the coating chamber. Upon hitting the atomizer disk, liquid adhesive is then directed outward in small drops onto the seed.

In one embodiment, seed coating techniques include, for example, seed in a rotating pan or drum. Seed is then mist with water or other liquid and then gradually a fine inert powder, e.g., Diatomaceous earth, is added to the coating pan. Each misted seed becomes the center of a mass of powder, layers, or coatings that gradually increases in size. The mass is then rounded and smoothed by the tumbling action in the pan, similar to pebbles on the beach. The coating layers are compacted by compression from the weight of material in the pan. Binders often are incorporated near the end of the coating process to harden the outer layer of the mass. Binders can also reduce the amount of dust produced by the finished product in handling, shipping and sowing. Screening techniques, such as frequent hand screening, are often times utilized to eliminate blanks or doubles, and to ensure uniform size. For example, tolerance for seed coating compositions described herein can be +/−1/64th inch (0.4 mm), which is the US seed trade standard for sizing, established long before coatings were introduced. For example, coated lettuce seed is sown most frequently with a belt planter through a 13/64 inch diameter round holes in the belt. This hole size requires that the seed coating compositions comprising lettuce seeds can be sized over a 7.5/64 inch screen and through an 8.5/64 Inch Screen.

In yet another embodiment, the seed coating compositions and methods described herein comprises "in situ coating". In situ coating means, in one embodiment, where a raw or non-coated seed is implanted in a hole, cavity or hollowed area in the ground and immediately or soon thereafter a coating composition is sprayed or applied directly into the hole, cavity or hollowed area to surround or partially surround the seed. Typically, the application of the seed as well as application of the coating composition are performed mechanically, but is understood that either or both of the referenced applications can be performed manually as well.

It is understood that embodiments other than those expressly described herein come within the spirit and scope of the present claims. Accordingly, the invention described herein is not defined by the above description, but is to be accorded the full scope of the claims so as to embrace any and all equivalent compositions and methods.

EXAMPLES

Some embodiments of the invention will now be described in the following Examples, wherein all parts and percentages are by weight unless otherwise specified.

1. Preparation of Polyolefin Dispersions

Polyolefin Dispersions were prepared as follows:
1.1 Preparation of polyolefin dispersions of the inventive examples:

Seven polar polyolefin dispersions (examples 1-7) used as film forming agents were prepared following a general procedure: deionized water (77 g), the polar polyolefin resin (PRIMACOR 5980i is from SK Global Chemical) (22 g), and the neutralization base (NaOH, TEA or ammonia, the percentage in front of NaOH, TEA or ammonia means that percentage of the carboxylic acid in the polymer was neutralized by NaOH, TEA or ammonia) were charged to a 1000 ml parr reactor at the targeted neutralization level. The reactor was heated to 110° C. while mixing at 300 RPM for 4 hours until a uniform dispersion was obtained. Their compositions are listed in Table 1.

The solid content after the above treatment was 23±1% wt.

1.2 Preparation of polyolefin dispersions of the comparative examples:

The comparative example A, which was purchased from a supplier, was also evaluated as comparisons. A comparative example B, which does not have any polymer but has other components in the seed coating recipe, was also evaluated.

TABLE 1

Polyolefin Dispersion Used in the Seed Coating Formulation

| Polymer | Type | Main monomers | Neutralized by | Supplier |
|---|---|---|---|---|
| Example 1# | Ethylene acrylic acid polymer | Ethylene:acrylic acid = 80:20 (weight ratio) | 100% NaOH | as prepared in Section 1.1 of the Examples |
| Example 2# | Ethylene acrylic acid polymer | Ethylene:acrylic acid = 80:20 (weight ratio) | 60% $NH_3$ | as prepared in Section 1.1 of the Examples |
| Example 3# | Ethylene acrylic acid polymer | Ethylene:acrylic acid = 80:20 (weight ratio) | 80% $NH_3$ | as prepared in Section 1.1 of the Examples |
| Example 4# | Ethylene acrylic acid polymer | Ethylene:acrylic acid = 80:20 (weight ratio) | 100% $NH_3$ | as prepared in Section 1.1 of the Examples |
| Example 5# | Ethylene acrylic acid polymer | Ethylene:acrylic acid = 80:20 (weight ratio) | 60% TEA | as prepared in Section 1.1 of the Examples |
| Example 6# | Ethylene acrylic acid polymer | Ethylene:acrylic acid = 80:20 (weight ratio) | 80% TEA | as prepared in Section 1.1 of the Examples |

TABLE 1-continued

Polyolefin Dispersion Used in the Seed Coating Formulation

| Polymer | Type | Main monomers | Neutralized by | Supplier |
|---|---|---|---|---|
| Example 7# | Ethylene acrylic acid polymer | Ethylene:acrylic acid = 80:20 (weight ratio) | 100% TEA | as prepared in Section 1.1 of the Examples |
| Comparative Example A | Ethylene-vinyl acetate polymer | Ethylene and vinyl acetate | unknown | Sichun Wei Ni Lun |
| Comparative Example B | No polymer | N/A | N/A | N/A |

2. Experiment Method 2.1 Seed Coating Formulation Preparation:

The procedure below was used to prepare the 30% thiamethoxam seed coating formulation using the recipe as shown in Table 2.

Water, a wetting agent, and a dispersing agent were added into a stainless steel jar (GERUISI®, type: SMJ-2-180), and then mixed until completely dissolved. An anti-foam agent was added into the solution and mixed well after which thiamethoxam was added into the solution. First, it was mixed with a glass rod followed by mixing with a high speed homogenizer (IKA® T25 digital) at 4,000 rpm for 5 minutes to form a uniform initial pesticide slurry. 50 g of grinding beads (Φ=2 mm) were added into the slurry and grinding was continued for 3 hours. After grinding, the pesticide formulation was filtered through a 100 mesh strainer to remove the beads and the large active ingredient particles to obtain the initial formulation. Pigment slurry, KATHON® LX 150, magnesium aluminometasilicate, 2 wt % Xanthan gum and an anti-freeze agent were added in the formulation and mixed with a high speed homogenizer at 4,000 rpm for 15 minutes to obtain the stock formulation. The stock formulation was separated into several parts. Each polar polyolefin dispersion example was added into each part, and then mixed well.

TABLE 2

30% Thiamethoxam seed Coating Formulation

| Raw material | Function | Weight (%) | supplier |
|---|---|---|---|
| Thiamethoxam | Active ingredient | 30 | Shenzhen Noposion |
| TERGITOL ™ W-600 | Wetting agent | 1 | Dow Chemical |
| DOWFAX ™ D-800 | Dispersing agent | 4 | Dow Chemical |
| Propylene Glycol | Anti-freeze agent | 3 | Shanghai Chemical reagent company |
| DOW CORNING ™ AFE-0020 Antifoam Emulsion | Anti-foam agent | 0.3 | Dow Chemical |
| KATHON ® LX 150 | Biocide | 0.1 | Rohm & Haas Electronic Materials Company |
| magnesium aluminometasilicate | Rheology modifier | 1 | Shanghai Chemical reagent company |
| 2 wt % Xanthan gum | Thickener | 8 | Shanghai Chemical reagent company |
| Dycoseed Red R2002-S | Pigment slurry | 5 | Tianjin Dychrom |
| Polar polyolefin dispersion | Film forming agent | 10 | as prepared in Section 1.1 |
| water | | Make up to 100 | |

2.2 Corn Seed Coating:

The procedure below was used to coat corn seeds with a 30% thiamethoxam seed coating formulation.

A 1 g seed coating formulation with a film forming agent was added into a 200 ml plastic bottle. 50 g corn seeds were added into the plastic bottle, and then the cover was closed immediately. The plastic bottle was shaken by hand with the frequency of twice per second, and shaking was maintained for 1 minute. After shaking, the corn seeds were poured on a filter paper to dry.

2.3 Seed Coating Performance Tests:

The followings tests were carried out in this study:

2.3.1 Attrition rate 10 g of coated seeds were placed in a 250 mL conical flask and covered with a lid. Then the flask was placed on the IKA® rotating shaking machine, type KS501. After shaking at a speed of 200 r/min for 10 minutes, the seeds were taken out carefully and observed visually.

The appearance of the seeds is classified as 3 grades as shown in FIG. 1. Grade 3 is the worst and Grade 1 is the best. The seeds were evaluated based on the designation Grade 1, Grade 2, and Grade 3 (see Table 3 below). The acceptable attrition rates are Grades 1 and 2.

2.3.2 Water Resistance

Three coated seeds were put into a petri dish and water was added to just cover the seeds. After 24 hours, the dish was observed visually.

Figure 2:
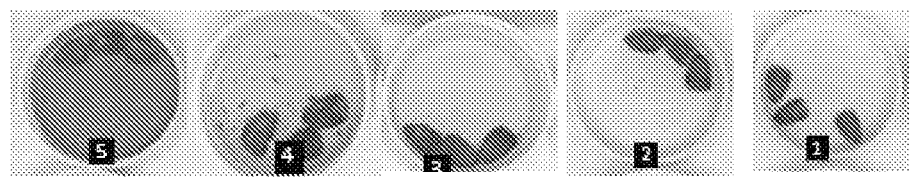
FIG. 2 shows the classification of water resistance.

The water resistance is classified as 5 grades as shown in FIG. 2. Grade 5 is the worst and Grade 1 is the best. The seeds were evaluated based on the designation Grade 1, Grade 2, Grade 3, Grade 4, and Grade 5 (see Table 3 below). The acceptable water resistance is Grades 1 and 2.

2.3.3 Germination Rate 20 coated seeds were put in the germination plate. Water was added to the plate to ensure a humid environment around the seeds. Spray the seeds with water once per 2 hours and then cover the plate (Room temperature 23±2° C.

and humidity 50±5% RH). After 7 days the seeds were observed to see how many seeds germinated. The acceptable germination rate is equivalent or better than the seeds which are not coated.

2.3.4 Seedling Height

After germination, the seedling height after 7 days was also measured to evaluate the impact of the seed coating formulation on the plant growth.

3. Result

To verify which polymer type(s) would work well and provide acceptable water resistance, attrition rate and seed germination rate, examples 1-7 and comparative examples A-B were added to the seed coating recipe, and then coated on the corn seeds following the above procedure. Water resistance, attrition rate and germination rate experiments were conducted and the results are shown in Table 3 and FIG. 3.

TABLE 3 water resistance result of FS with different EAA polymers

| Examples | Water resistance | Attrition rate | Germination rate (%) 7 days | Average seedling height (cm) 7 days |
|---|---|---|---|---|
| Example 1# | 2 | 1 | 95 | 4.3 |
| Example 2# | 2 | 1 | 60 | 4.4 |
| Example 3# | 2 | 1 | 80 | 4.3 |
| Example 4# | 2 | 1 | 90 | 5.9 |
| Example 5# | 2 | 1 | 100 | 7.1 |
| Example 6# | 2 | 1 | 95 | 5.8 |
| Example 7# | 2 | 1 | 75 | 4.0 |
| Comparative example A | 4 | 2 | 90 | 6.0 |
| Comparative example B | 5 | 2 | 95 | 6.8 |

Figure 3:
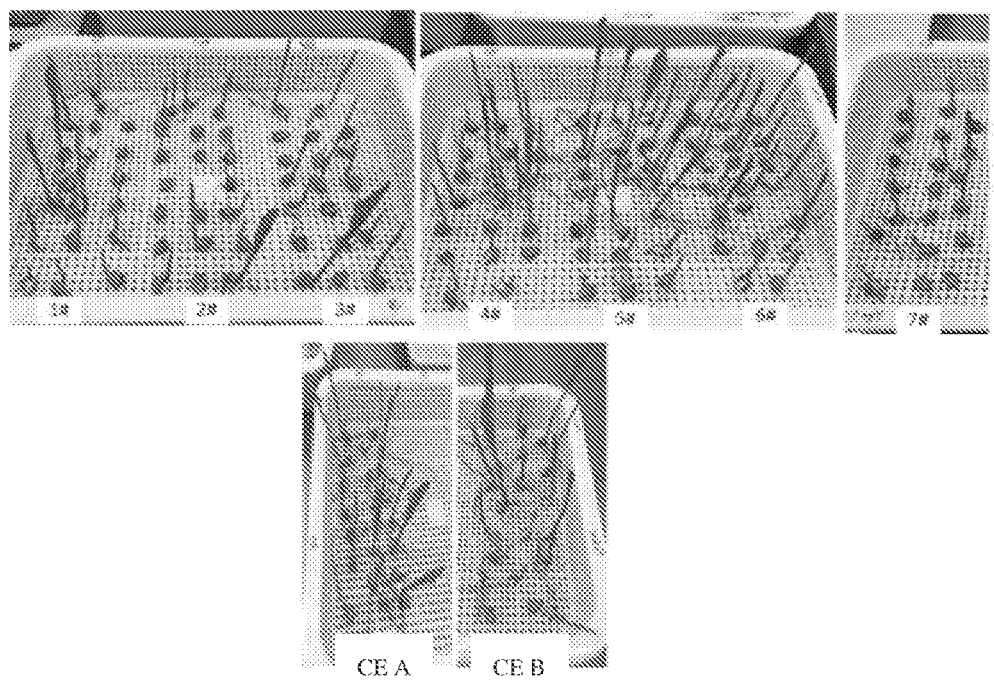
FIG. 3 shows the seed germination after 7 days.

As showed in Table 3 and FIG. 3, generally examples 1-7 showed much better water resistance and attrition rate compared to Comparative example A (Ethylene-vinyl acetate polymer) and Comparative example B (No polymer). For germination and plant growth performance, the inventive examples #4 and #6, which are 100% NH$_3$ neutralized and 80% TEA neutralized respectively, showed similar germination rate and an average seedling height to Comparative example A However, the inventive example #5, which is 60% TEA neutralized, showed a better germination rate and a higher average seedling height compared to Comparative examples A. If there was no polymer in the seed coating formulation (Comparative example B), as expected, the water resistance was very bad which indicated the active ingredient (e.g., pesticide etc.) would be easily lost in the soil. Example #5 still had a better germination rate and higher average seedling height than Comparative example B, which indicated either the polyolefin or the neutralization base (TEA) brought in additional benefits to the seed, such as nutrition.

4. Conclusion

Based on a study of 7 experimental examples and 2 comparative examples as seed coating components, a film forming polymer is needed in the seed coating formulation. Improved performance was obtained with a polar polyolefin dispersion neutralized by TEA or ammonia compared to a commercial ethylene-vinyl acetate based seed coating.

The invention claimed is:

1. A coated seed comprising
   A) a seed, and
   B) a coating composition coated on the seed comprising a polar polyolefin dispersion, which comprises:
      i) a polar polyolefin; and
      ii) a neutralizing base;
   wherein the polar polyolefin is an olefin copolymer that contains one or more polar groups, wherein the polar groups are selected from the group consisting of a carboxylic acid group, a carboxylic acid anhydride group or a carboxylic acid salt moiety;
   wherein the neutralizing base is a base that modifies at least a portion of the carboxylic acid group, carboxylic acid anhydride group or carboxylic acid salt moiety of the polymer to form a stable aqueous dispersion with the polar polyolefin;
   and wherein the neutralizing base is triethanolamine (TEA), and 20 to 90 mole percent of the carboxylic acid groups or the carboxylic acid anhydride groups are modified by the neutralizing base.

2. The coated seed of claim 1, wherein the polar polyolefin is a copolymer of an olefin and an ethylenically unsaturated monomer that contains one or more polar groups, wherein the polar groups are selected from the group consisting of a carboxylic acid group, a carboxylic acid anhydride group or carboxylic acid salt moiety.

3. The coated seed of claim 2, wherein the olefin is a linear or branched C2-C6 α-olefin, and the ethylenically unsaturated monomer that contains one or more polar groups is selected from the group consisting of acrylic acid, methacrylic acid, maleic acid, fumaric acid, itaconic acid, acrylic anhydride, methacrylic anhydride, maleic anhydride, fumaric anhydride, itaconic anhydride.

4. The coated seed of claim 1, wherein the polar polyolefin is selected from the group consisting of ethylene/acrylic acid copolymer, ethylene/methacrylic acid 17 copolymer, propylene/acrylic acid copolymer, and propylene/methacrylic acid copolymer.

5. The coated seed of claim 1, further comprising active ingredients, nutrients, fillers or other additives.

6. The coated seed of claim 5, wherein the other additives are selected from the group consisting of wetting agents, colorants, rheology modifiers, dispersing agents, anti-foam agents, anti-freeze agents, surfactants, fertilizers, and thickeners.

7. The coated seed of claim 1, wherein about 40 to 85 mole percent of the carboxylic acid groups or the carboxylic acid anhydride groups of the polymer are modified by the neutralizing base.

8. The coated seed of claim 1, wherein about 50 to about 80 mole percent of the carboxylic acid groups or the carboxylic acid anhydride groups are modified by the neutralizing base.

9. The coated seed of claim 1, wherein the content of the polar polyolefin together with the neutralizing base in the seed coating composition is about 0.2~10 wt %, based on the total weight of the seed coating composition.

* * * * *